(12) United States Patent
Farr et al.

(10) Patent No.: US 10,584,622 B2
(45) Date of Patent: Mar. 10, 2020

(54) EXPANSION BODY AND METHOD FOR MONITORING A PRESSURE SENSOR IN A SCR SYSTEM WITH AN EXPANSION BODY

(71) Applicant: Robert Bosch GmbH, Stuttgart (DE)

(72) Inventors: Thomas Farr, Ludwigsburg (DE); Claus Linsenmaier, Kirchheim Unter Teck (DE)

(73) Assignee: Robert Bosch GmbH, Stuttgart (DE)

( * ) Notice: Subject to any disclaimer, the term of this patent is extended or adjusted under 35 U.S.C. 154(b) by 157 days.

(21) Appl. No.: 15/873,334

(22) Filed: Jan. 17, 2018

(65) Prior Publication Data

US 2018/0202340 A1 Jul. 19, 2018

(30) Foreign Application Priority Data

Jan. 19, 2017 (DE) .......................... 10 2017 200 832

(51) Int. Cl.
| | | |
|---|---|---|
| *B01D 53/94* | (2006.01) | |
| *F01N 3/00* | (2006.01) | |
| *F01N 3/08* | (2006.01) | |
| *F01N 3/20* | (2006.01) | |

(Continued)

(52) U.S. Cl.
CPC ......... *F01N 3/208* (2013.01); *B01D 53/9418* (2013.01); *B01D 53/9495* (2013.01); *F01N 3/2066* (2013.01); *F16L 55/053* (2013.01); *G01L 27/007* (2013.01); *F01N 2610/02* (2013.01); *F01N 2610/144* (2013.01); *F01N 2610/148* (2013.01);

(Continued)

(58) Field of Classification Search
CPC ................ B01D 53/94; B01D 53/9418; B01D 53/9495; G01L 27/007; F01N 3/00; F01N 3/08; F01N 3/20; F01N 3/208; F01N 3/2066; F01N 2610/02; F01N 2610/144; F01N 2610/1433; F01N 2610/1446; F01N 2610/148; F01N 2900/1808; F16L 51/00; F16L 55/053; Y02T 10/24
See application file for complete search history.

(56) References Cited

U.S. PATENT DOCUMENTS

| 5,408,970 A * | 4/1995 | Burkhard | .................. F01N 3/26 |
| | | | 123/447 |
| 5,590,631 A * | 1/1997 | Tuckey | ................. F02D 33/003 |
| | | | 123/447 |

(Continued)

FOREIGN PATENT DOCUMENTS

DE        102004022115        11/2005

*Primary Examiner* — Nguyen Q. Ha
(74) *Attorney, Agent, or Firm* — Michael Best & Friedrich LLP

(57) ABSTRACT

The invention relates to an expansion body having an equalization chamber, which is separated by an elastic diaphragm from a fluid which flows through part of the expansion body. A mechanical spring applies an additional spring force to the diaphragm, wherein the spring has mechanical prestress. In addition, the invention relates to an SCR system with such an expansion body, and a method for monitoring a pressure sensor in such a SCR system with an expansion body. The method comprises the following steps: first, an anticipated characteristic pressure at which the spring force of the spring of the expansion body is overcome is defined by setting the prestress of the spring in the expansion body.

10 Claims, 4 Drawing Sheets

(51) Int. Cl.
*F16L 55/053* (2006.01)
*G01L 27/00* (2006.01)

(52) U.S. Cl.
CPC .............. *F01N 2610/1433* (2013.01); *F01N 2610/1446* (2013.01); *F01N 2900/1808* (2013.01); *Y02T 10/24* (2013.01)

(56) References Cited

U.S. PATENT DOCUMENTS

| | | | | |
|---|---|---|---|---|
| 5,701,869 | A * | 12/1997 | Richardson | F02D 41/3082 |
| | | | | 123/447 |
| 5,842,455 | A * | 12/1998 | Tuckey | F02M 37/0029 |
| | | | | 123/514 |
| 6,478,051 | B1 * | 11/2002 | Drumm | F15B 1/033 |
| | | | | 138/30 |
| 7,089,962 | B2 * | 8/2006 | Bleeck | F16K 17/04 |
| | | | | 138/32 |
| 9,617,885 | B2 * | 4/2017 | Dyrbusch | F01N 3/10 |
| 2003/0033799 | A1 * | 2/2003 | Scheying | B01D 53/9431 |
| | | | | 60/286 |
| 2008/0264041 | A1 | 10/2008 | Gerlach | |
| 2008/0314452 | A1 * | 12/2008 | Smith | G05D 11/006 |
| | | | | 137/3 |
| 2012/0324865 | A1 * | 12/2012 | Habumuremyi | F01N 3/208 |
| | | | | 60/274 |
| 2015/0354429 | A1 * | 12/2015 | Thompson | F01N 3/208 |
| | | | | 137/4 |
| 2018/0306215 | A1 * | 10/2018 | Kloft | F04B 39/0027 |
| 2019/0170047 | A1 * | 6/2019 | Venekamp | F16K 31/0672 |

* cited by examiner

EXPANSION BODY AND METHOD FOR MONITORING A PRESSURE SENSOR IN A SCR SYSTEM WITH AN EXPANSION BODY

BACKGROUND OF THE INVENTION

The invention relates to an expansion body with a spring which is under prestress, and to an SCR system with such an expansion body. Furthermore, the invention relates to a method for monitoring a pressure sensor in such an SCR system. In addition, the invention relates to a computer program which executes each step of the method when it is executed on a computing device, and to a machine-readable storage medium which stores the compute program. Finally, the invention relates to an electronic controller which is configured to execute the method according to the invention.

Nowadays, the SCR (Selective Catalytic Reduction) method is used during the post-treatment of exhaust gases, in order to reduce nitrogen oxides (NOx) in the exhaust gas. The SCR method is primarily used in motor vehicles. A urea-water solution (HWL), also known commercially as AdBlue®, is introduced as a reducing agent solution into the oxygen-rich exhaust gas. For this purpose, a metering valve is used which comprises a nozzle for spraying the urea-water solution into the exhaust gas stream. Downstream of an SCR catalytic converter, the urea-water solution reacts to form ammonia, which subsequently binds with the nitrogen oxides at the SCR catalytic converter, producing water and nitrogen. The metering valve is connected to a feed module via a pressure line. A feed pump of the feed module pumps the urea-water solution from a reducing agent tank to the metering module. In addition, a return line is connected to the reducing agent tank, via which excess urea-water solution can be fed back. An orifice or throttle in the return line controls the return flow.

In order to determine and monitor the pressure in the SCR system, a pressure sensor is provided in the pressure line. In order to ensure the functional capability of the pressure sensor a pitch error is to be detected in addition to an offset error. By means of this detection, the legal requirements relating to the monitoring of what are referred to as "comprehensive components" for on-board diagnostics (OBD) are to be satisfied.

DE 10 2004 022 115 A1 describes a method for performing diagnostics of the pressure sensor. Checking as to whether the pressure sensor signal corresponds at least approximately to the steady-state pressure is provided in at least a first time interval in which a steady-state pressure state is expected. Furthermore, in at least a second time interval, in which a change in pressure occurs, it is checked whether the pressure sensor signal corresponds at least approximately to a predefined test pressure and/or has approximately a predefined change with respect to the steady-state pressure. An error signal is made available if at least one of the conditions is not satisfied. An alternative provides that in the second time interval the difference quotient and/or the differential quotient of the time profile of the pressure signal is determined and evaluated.

In SCR systems, expansion bodies are used, predominantly in order to compensate an increasing volume, and therefore, associated therewith, increasing pressure, if the urea-water solution which is located in the pressure line connected to the expansion body freezes. The expansion body has an equalization chamber which is separated by means of a diaphragm from the pressure line and the urea-water solution which is located therein. If the pressure in the pressure line increases, the diaphragm is pressed in the direction of the equalization chamber, with the result that its volume decreases and a gas enclosed therein is compressed. When the pressure is reduced, the diaphragm returns to its initial position. It is also known to connect a mechanical spring to the diaphragm, with the result that a spring force is applied to the latter. The spring is preferably arranged inside the equalization chamber.

SUMMARY OF THE INVENTION

An expansion body is proposed which has an equalization chamber and an elastic diaphragm. The equalization chamber is separated by the elastic diaphragm from a fluid which flows through part of the expansion body, for example a line. A mechanical spring, which is preferably arranged inside the equalization chamber, is connected to the diaphragm and applies an additional spring force thereto, counter to the equalization chamber. The spring is loaded with a mechanical prestress, that is to say it has a mechanical stress without external forces. The mechanical prestress can be applied by means of a mechanical stop for the spring. In other words, during mounting, in particular of the mechanical stop, the spring is stressed and as a result applies the additional spring force to the diaphragm, which spring force has to be overcome by the pressure of the fluid before the diaphragm expands in the direction of the equalization chamber. The rigidity of the expansion body can be varied by means of the prestress, in particular in such a way that the rigidity of the expansion body changes significantly when the fluid has reached a characteristic pressure at which the additional spring force is overcome.

The equalization chamber can optionally have a pressure equalization opening. The equalization chamber is in contact with the ambient pressure through the pressure equalization opening, with the result that said pressure serves as a reference value for the expansion body and the characteristic pressure. This is advantageous, in particular, in the case of a presented method for monitoring a pressure sensor in an SCR system, since such pressure sensors usually relate to the ambient pressure as a reference.

According to one aspect, such an expansion body is used in an SCR system. The SCR system comprises a feed module with a feed pump for feeding a reducing agent solution from a reducing agent tank, and a metering valve for metering the reducing agent solution in an exhaust gas section. The feed module and the metering valve are connected to one another by a pressure line. A pressure sensor, which measures the pressure at least in the pressure line, and the expansion body are arranged in the pressure line. An already present expansion body, which is provided for compensating a volume or pressure of the reducing agent solution which increases when freezing occurs, can, where appropriate, be advantageously adapted and used as described above. At least one return line connects the pressure line and the reducing agent tank. In this SCR system, the feed pump builds up a pressure which is reduced again by the return flow after the feed pump has stopped. A pressure rate is determined by means of the pressure sensor, wherein the ambient pressure preferably serves as a reference for the pressure sensor. The pressure rate changes significantly at the characteristic pressure at which the spring force is overcome for the expansion body, and as a result the diaphragm is pressed into the equalization space.

According to one aspect, an orifice is arranged in the return line, and according to a further aspect a restrictor is arranged therein, said orifice and restrictor constricting the return line. Accordingly, the pressure rate is dependent on the orifice or the throttle.

Furthermore, a method for monitoring the pressure sensor in such an SCR system with the expansion body described above is proposed. The method comprises the following steps: at the start, an anticipated characteristic pressure at which the spring force of the spring of the expansion body is overcome is defined by correspondingly setting the prestress of the spring in the expansion body. The anticipated characteristic pressure therefore reflects an actual pressure. The anticipated characteristic pressure preferably lies outside a use range of the SCR system, in order to avoid disrupting the SCR system by changes in the expansion body, in particular the rigidity thereof, in the use range. The anticipated characteristic pressure particularly preferably lies outside the use range of the SCR system. The latter provides advantages, in particular, if an operating point of the pressure sensor below the use range is already known, in particular by means of an error detection means for an offset of the pressure sensor at ambient pressure, said means often being designed to perform monitoring. At such times a (pitch) error which is determined as described below is also valid for the use range. A highest possible level of sensitivity of the monitoring is therefore achieved.

If the metering valve is open, for example, on the basis of a metering request, it is closed. In a further step, an initial pressure in the SCR system is set by means of the feed pump in such a way that it lies above the characteristic pressure. Alternatively, the metering valve is not closed until after the initial pressure is reached. As soon as the initial pressure is reached, the feed pump is stopped. The pressure subsequently decreases via the return line. The pressure rate in the pressure line is determined over the time by means of the pressure sensor to be monitored. For this purpose the change in the pressure measured by the pressure sensor is evaluated.

If the pressure drops to the characteristic pressure described above, at which the spring force in the expansion body has been overcome, this gives rise to a significant change in the pressure rate. The significant change in the pressure rate at which the change in the pressure rate is above a first threshold, is determined in a further step. For this purpose, in particular a difference quotient and a differential quotient of the pressure rate and the second derivation of the pressure and the like are used. An associated measured characteristic pressure is determined from the significant change.

The measured characteristic pressure, which therefore depends directly on the pressure sensor, and the anticipated characteristic pressure which is based on a physical effect, specifically the balanced forces between the spring force of the spring and the force which acts on the diaphragm owing to the pressure in the pressure line, are compared. Ambient pressure advantageously prevails in the equalization chamber, for example via a pressure equalization means, said ambient pressure serving, as it were, as a reference for the pressure sensor. If the measured characteristic pressure does not lie between thresholds which are dependent on the anticipated characteristic pressure, that is to say in a tolerance range around the anticipated characteristic pressure, an error is output for the pressure sensor.

BRIEF DESCRIPTION OF THE DRAWINGS

Exemplary embodiments of the invention are illustrated in the drawings and explained in more detail in the following description.

DETAILED DESCRIPTION

Figure 1:
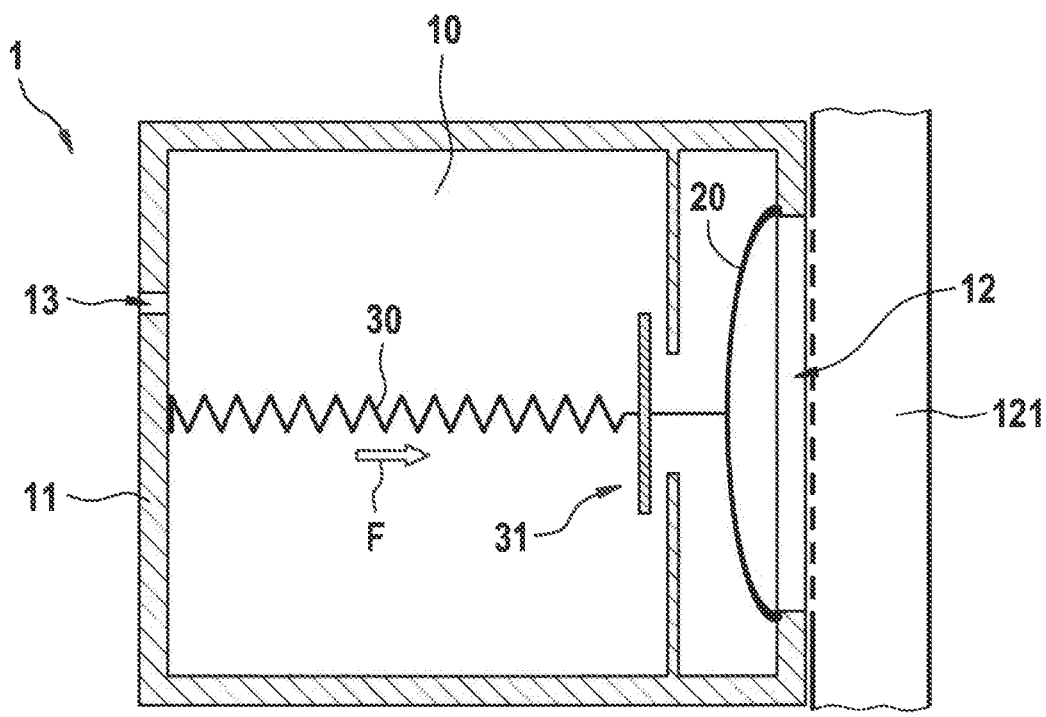
FIG. 1 shows a schematic cross-sectional view through an expansion body according to an exemplary embodiment of the invention.

FIG. 1 shows a schematic cross-sectional view through an expansion body 1 of an equalization chamber 10 which is enclosed by a housing 11 except for an opening 12. A diaphragm 20, e.g. an elastomer diaphragm, closes off the opening 12 of the equalization chamber 10 with respect to a line 121 in an air-tight fashion. A pressure equalization opening 13, which connects the equalization chamber 10 to an ambient pressure $p_u$, is formed in the housing 11. Furthermore, a spring 30, e.g. a spring steel helical spring, is formed in the equalization chamber 10, is prestressed by means of a stop 31 and applies a spring force F to the diaphragm 20. When the pressure p in the line 121 rises, a force which acts on the diaphragm 20 in the direction of the equalization chamber 10, acts until the acting force is larger in the case of a characteristic pressure than the spring force F. The diaphragm 20 is then pressed in the direction of the equalization chamber 10 and compresses the air located therein.

Figure 2:
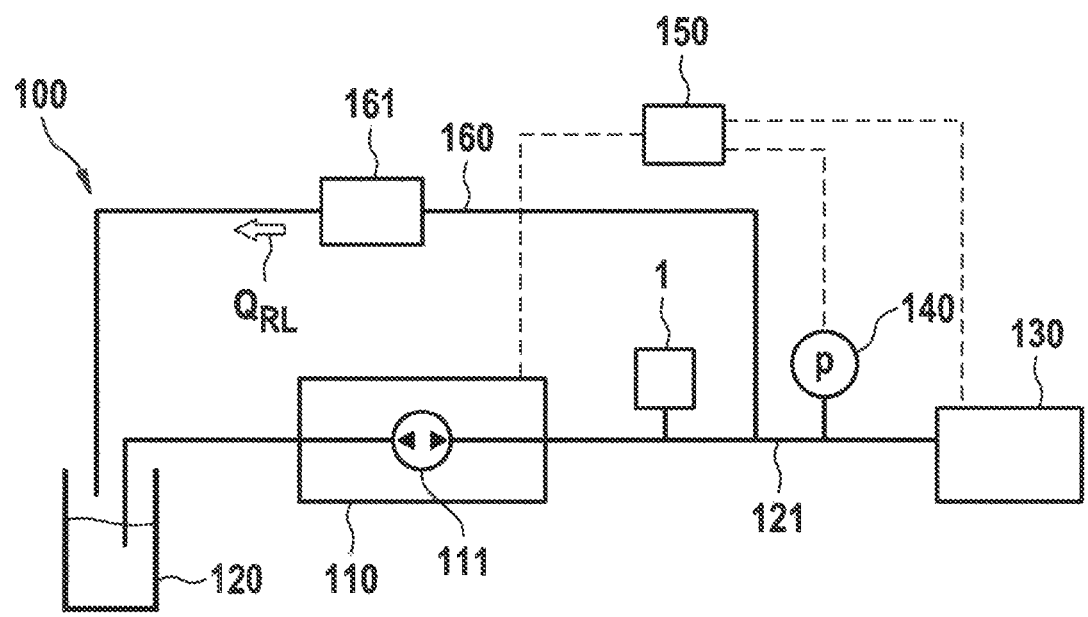
FIG. 2 shows a schematic illustration of a reducing agent feed system with the expansion body according to an exemplary embodiment of the invention.

A schematic illustration of a reducing agent feed system 100 of an SCR system (not illustrated) is shown in FIG. 2. It comprises a feed module 110 which has a feed pump 111 which is configured to feed reducing agent from a reducing agent tank 120 to a metering valve 130 via a pressure line 121, at which metering valve 130 the reducing agent is then sprayed into an exhaust gas section (not illustrated). The expansion body 1 (illustrated in FIG. 1) is arranged in the pressure line 121. Furthermore, a pressure sensor 140 is arranged in the reducing agent feed system 100 and configured to measure the pressure p at least in the pressure line 121 over a time period. An electronic controller 150 is connected to the pressure sensor 140 and receives therefrom information about the pressure p in the system 100. Furthermore, the electronic controller 150 is connected to the feed module 110, including the feed pump 111, as well as to the entire metering valve 130, and can control said components.

Furthermore, the reducing agent feed system 100 comprises a return line 160 through which reducing agent is fed back into the reducing agent tank 120 from the system. In this return line 160, an orifice 161 is arranged which provides local flow resistance. In a further exemplary embodiment, a restrictor is arranged in the return line, instead of the orifice 161.

Figure 3:
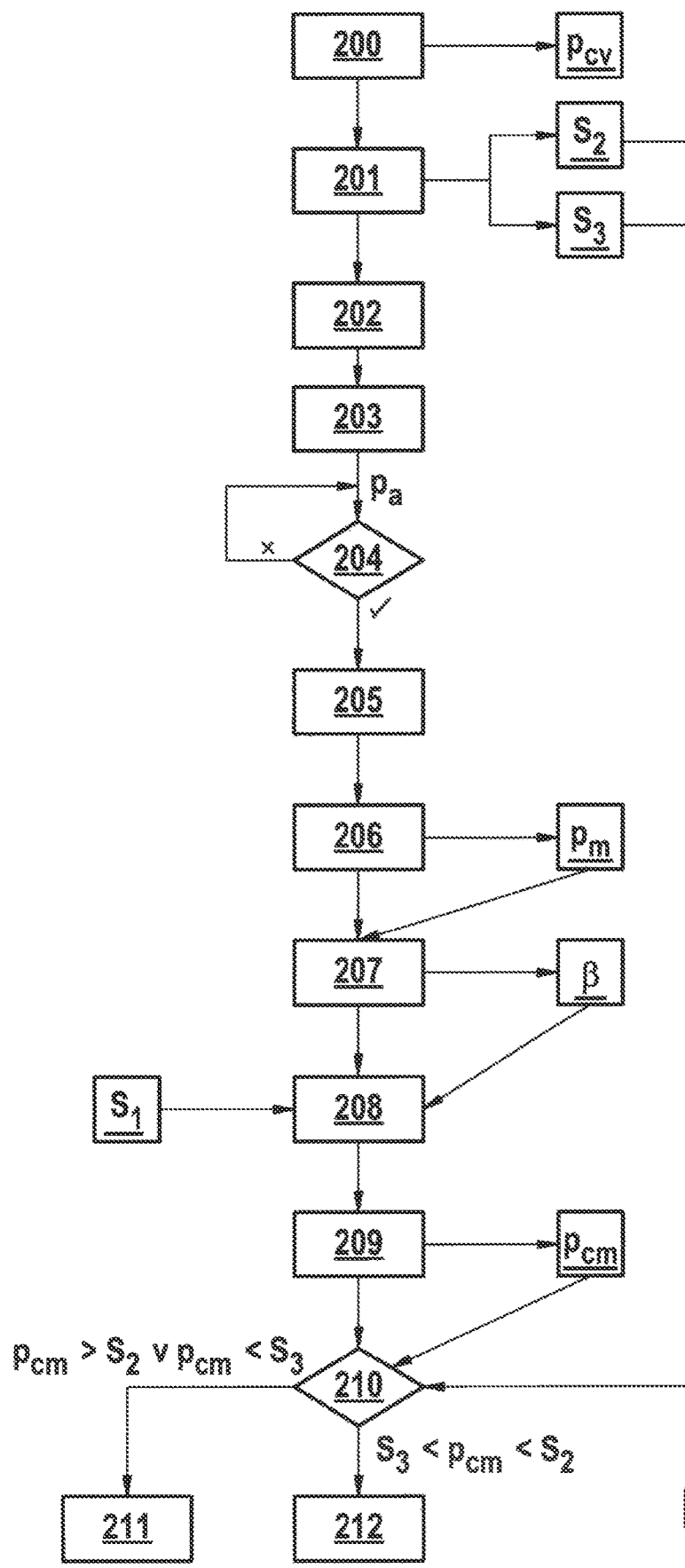
FIG. 3 shows a flowchart of a method according to an exemplary embodiment of the invention.
Figure 4:
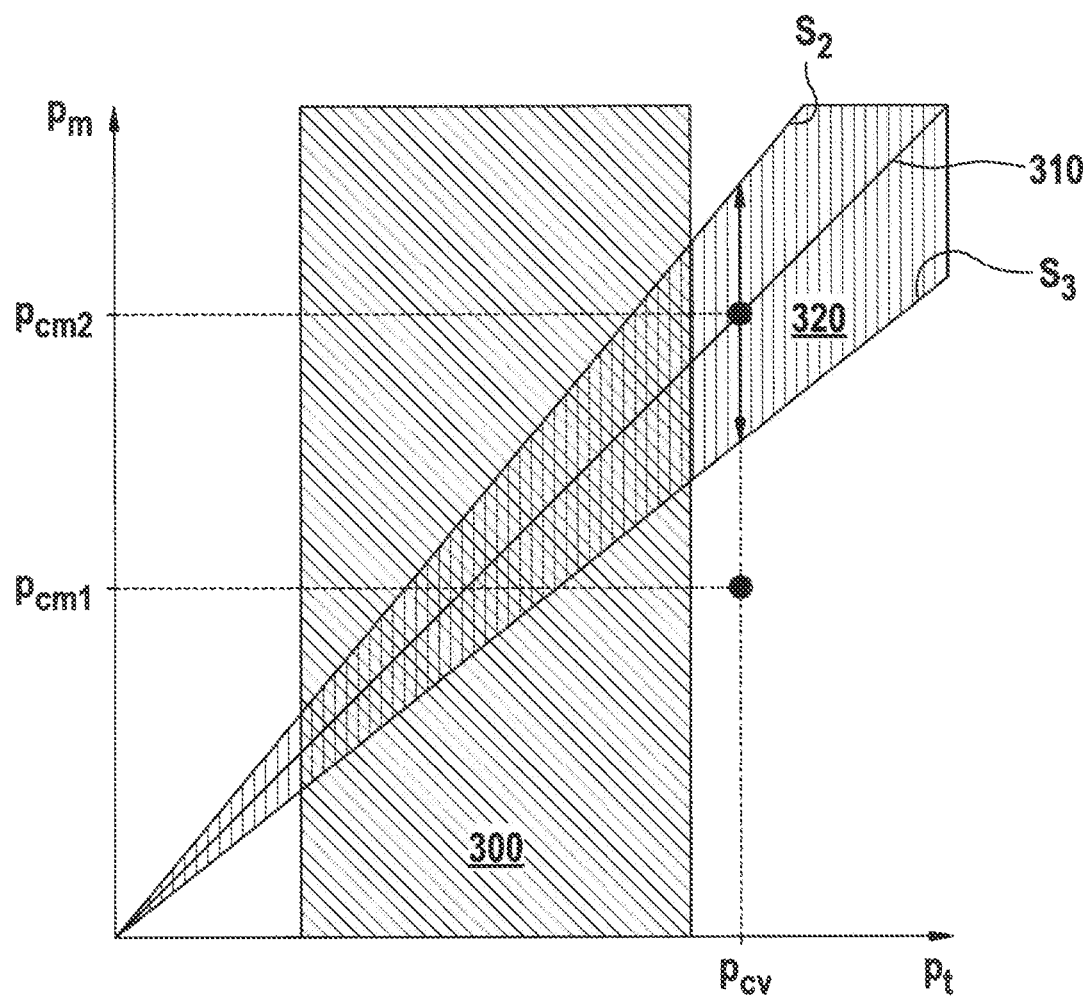
FIG. 4 shows a diagram of the measured pressure plotted against the actual pressure.

FIG. 3 illustrates a flowchart of an exemplary embodiment of the method according to the invention for monitoring the pressure sensor 140 in the reducing agent feed system 100 with the expansion body 1. In a first step, an anticipated characteristic pressure $p_{cv}$ at which the spring force F of the spring 30 is overcome is defined 200 by setting the prestress of the spring 30 in the expansion body 1. FIG. 4 illustrates a suitable selection of the anticipated characteristic pressure $p_{cv}$.

FIG. 4 shows a pressure $p_m$, measured by the pressure sensor 140, in the reducing agent feed system 100 plotted against the actual pressure $p_t$. A use range 300 is indicated in which the reducing agent feed system 100 predominantly operates. The anticipated characteristic pressure $p_{cv}$ is defined 200 above this use range 300. By using separate monitoring of the pressure sensor 140 below the use range 300, for example at ambient pressure, the pressure sensor in the use range 300 is also monitored, without the prestress of the spring 30 in the expansion body 1 and the associated change in rigidity κ influencing the reducing agent feed system 100 in the use range 300. The illustrated angle bisector 310 represents an optimum pressure sensor 140, which designates the actual pressure $p_t$ precisely as the measured pressure $p_m$. In addition to the angle bisector 310, an upper threshold $S_2$ and a lower threshold $S_3$ are illustrated which diverge from one another at a relatively high pressure. The thresholds $S_2$ and $S_3$ predefine a tolerance range 320 for the pressure sensor 140 and are dependent on the anticipated characteristic pressure $p_{cv}$.

In a further step of the flowchart from FIG. 3, said thresholds $S_2$ and $S_3$ are defined 201 for the anticipated characteristic pressure $p_{cv}$, with the result that the tolerance range 320 is adapted to operating conditions. The anticipated characteristic pressure $p_{cv}$ and the thresholds $S_2$ and $S_3$ can be stored in the electronic controller 150, with the result that when the method for monitoring the pressure sensor 140 is repeated, said pressure $p_{cv}$ and thresholds $S_2$ and $S_3$ do not have to be redefined 200 and 201.

The metering valve 130 is closed 202, subsequent to which an initial pressure $P_a$ above the anticipated characteristic pressure $p_{cv}$ is set by means of the feed pump 111. If it is determined in an interrogation 204 that the initial pressure $p_a$ has been reached, the feed pump 111 is stopped 205. The pressure p in the pressure line 121 is now decreased via the return line 160 and the orifice 161 arranged therein. The pressure sensor 140 measures 206 the pressure p in the pressure line 121 at this time, and passes on a measured pressure $p_m$ to the electronic controller 150.

Figure 5:
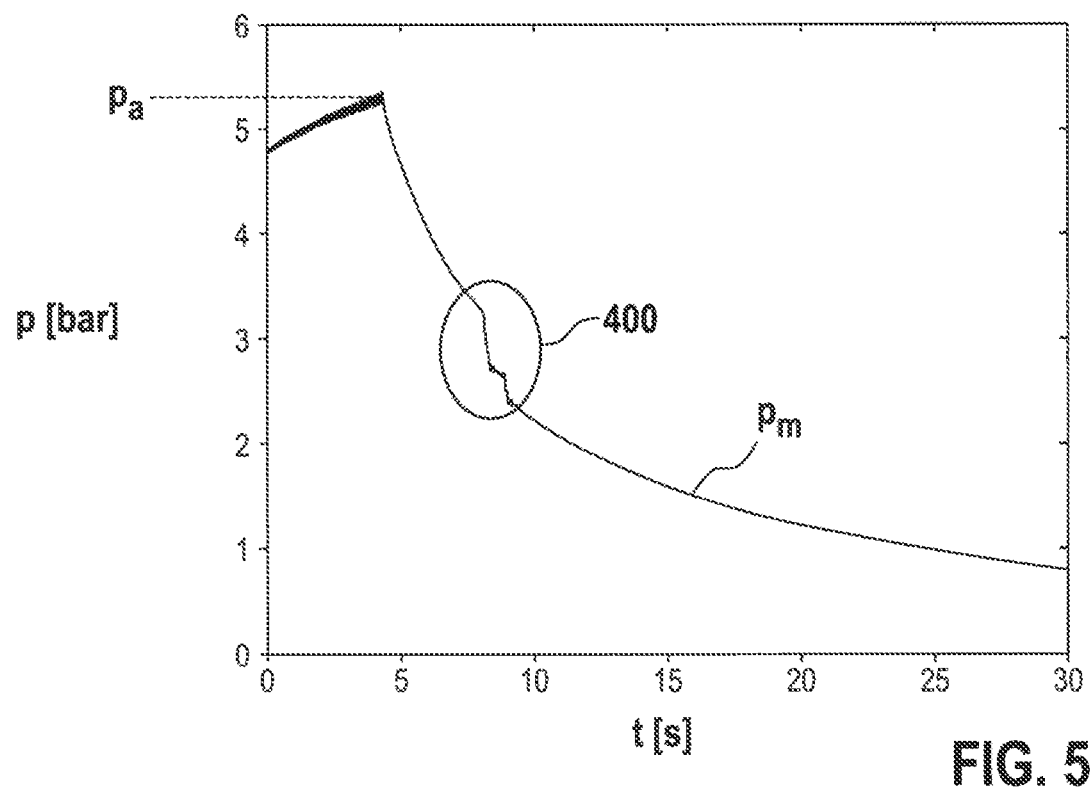
FIG. 5 shows a diagram of a pressure, measured by the pressure sensor, for the SCR system from FIG. 2 plotted against the time.

FIG. 5 illustrates the measured pressure $p_m$ plotted against the time t. At approximately five seconds, the pressure p reaches the initial pressure $p_a$ of approximately 5.2 bar, subsequent to which the feed pump 111 is stopped 205. In the reciprocal profile of the measured pressure $p_m$, a significant pressure drop 400 from approximately 3.3 bar to approximately 2.4 bar is detected at approximately eight seconds. In another exemplary embodiment, the characteristic pressure $p_{cm}$ is determined from this significant change in the pressure rate.

In this exemplary embodiment, a relative pressure rate β is determined 207 from the measured pressure $p_m$ as a further step in the flowchart in FIG. 3. The relative pressure rate β is defined for the orifice 161 according to formula 1a and for the restrictor according to formula 1b as follows:

$$\beta := -\frac{1}{\sqrt{p(t)}} \cdot \frac{dp(t)}{dt} \quad \text{(Formula 1a)}$$

$$\beta := -\frac{1}{p(t)} \cdot \frac{dp(t)}{dt} \quad \text{(Formula 1b)}$$

In this context, dp(t)/dt specifies the change of the pressure p(t) over time, that is to say the pressure rate. The dependence of the pressure rate dp(t)/dt on the rigidity κ and a change in volume dV(t)/dt is specified by means of formula 2 and formula 3:

$$\kappa = V \frac{dp(t)}{dV(t)} \quad \text{(Formula 2)}$$

$$\frac{dp(t)}{dt} = \frac{dp(t)}{dV(t)} \cdot \frac{dV(t)}{dt} = \frac{1}{V} \cdot V \cdot \frac{dp(t)}{dV(t)} \cdot \frac{dV(t)}{dt} = \frac{\kappa}{V} \frac{dV(t)}{dt} \quad \text{(Formula 3)}$$

According to the continuity equation (formula 4), the change in volume dV(t)/dt over time takes place through the entire volume flow $Q_{ges}$. In this case, the entire volume flow $Q_{ges}$ corresponds to the volume flow $Q_{RL}$ through the orifice 161.

$$\frac{dV(t)}{dt} = -Q_{ges} = -Q_{RL} \quad \text{(Formula 4)}$$

If the formulas 3 and 4 are inserted into the formula 1a and 1b, the dependence of the relative pressure rate β on the rigidity κ is obtained in accordance with formula 5a for the orifice 161 and formula 5b for the restrictor:

$$\beta := \frac{1}{\sqrt{p(t)}} \cdot \frac{1}{V} \cdot Q_{RL} \cdot \kappa \quad \text{(Formula 5a)}$$

$$\beta := \frac{1}{p(t)} \cdot \frac{1}{V} \cdot Q_{RL} \cdot \kappa \quad \text{(Formula 5b)}$$

The rigidity κ changes significantly, as described at the beginning for the characteristic pressure $p_c$, and consequently indicates when the spring force F of the spring 30 has been overcome. According to the relationship from formulas 5a and 5b, between the rigidity κ of the relative pressure rate β, the relative pressure rate β changes significantly at the characteristic pressure $p_c$. Such behavior is represented in FIG. 6.

Figure 6:
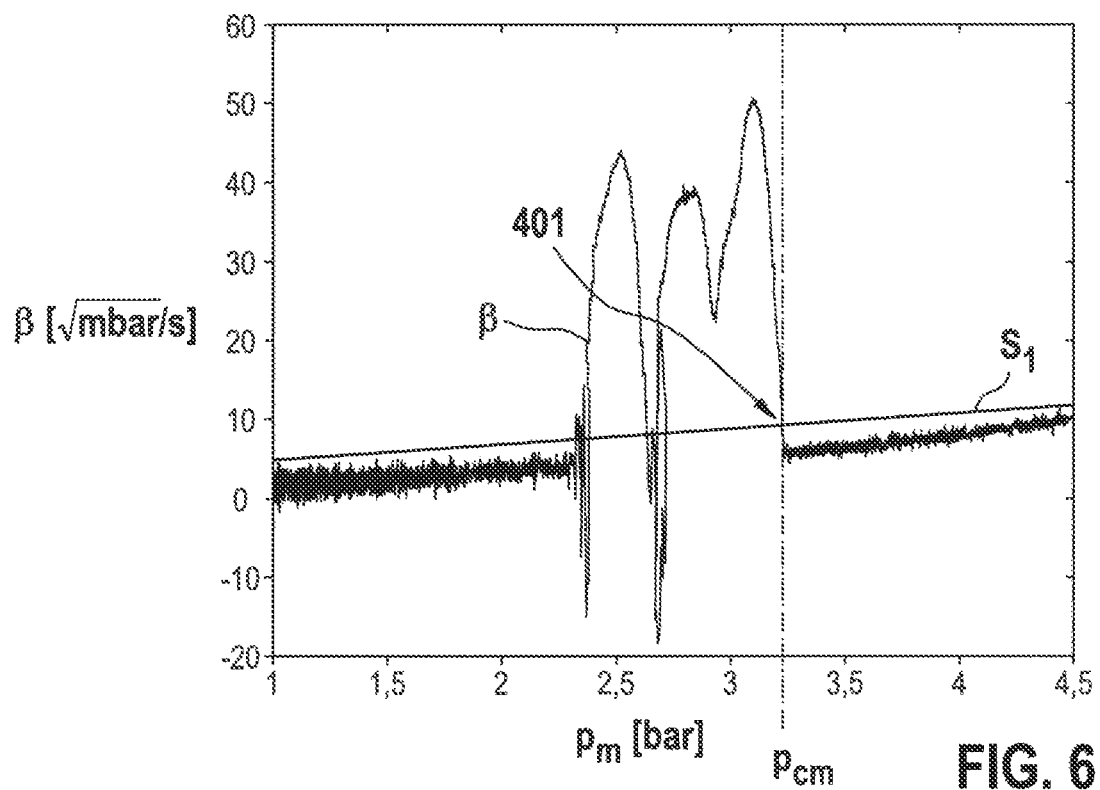
FIG. 6 shows a diagram of a relative pressure rate, determined from FIG. 5, plotted against the measured pressure.

The relative pressure rate β, which was determined 205 by means of formula 1a from FIG. 5, is illustrated in FIG. 6 in a diagram plotted against the measured pressure $p_m$. The measured pressure $p_m$ decreases within the reducing agent feed system 100, in particular within the pressure line 121, starting from the right of the diagram. At approximately 3.3 bar, the relative pressure rate β abruptly exceeds a first threshold $S_1$, with the result that the significant change 401 in the relative pressure rate β occurs at this point. It is apparent that the significant change 401 in the relative pressure rate β in FIG. 6 can be seen significantly more clearly than the associated significant pressure drop 400 in FIG. 5. In the flowchart in FIG. 3, the significant change 401 in the relative pressure rate β is determined 208, as just presented, if the relative pressure rate β exceeds the first threshold $S_1$. The first threshold $S_1$ is selected according to the conditions in such a way that it is higher than operationally induced changes in the relative pressure rate β, but low enough to cover the significant change 401 owing to the expansion body 1. The relative pressure rate β depends, as presented above, on the rigidity κ. The rigidity κ in turn changes significantly if the spring force F of the prestressed spring 30 in the expansion body 1 has been overcome, and the diaphragm 20 is pressed in the direction of the equalization chamber 10. So that this takes place, the pressure p in the pressure line 121 must correspond to the characteristic pressure $p_c$. Consequently, a measured characteristic pressure $p_{cm}$ at which the significant change 401 in the relative pressure rate β has been determined 208, is determined 209, as clarified in FIG. 6.

Then, a comparison 210 is carried out between the measured characteristic pressure $p_{cm}$ and the thresholds $S_2$ and $S_3$ which were defined 201 at the beginning, which depend on the anticipated characteristic pressure $p_{cv}$ and define the tolerance range 320. Reference is made in this respect also to FIG. 4. If the measured characteristic pressure $p_{cm}$ is above the upper threshold $S_2$ or below the lower threshold $S_3$, the measured characteristic pressure $p_{cm}$ and the anticipated characteristic pressure $p_{cv}$ do not correspond sufficiently and an error 211 is output for the pressure sensor 140. If the measured characteristic pressure $p_{cm}$ is, on the other hand, between the thresholds $S_2$ and $S_3$, an error 212 is not output.

FIG. 4 illustrates by way of example two measured characteristic pressures $p_{cm1}$ and $p_{cm2}$ for an anticipated characteristic pressure $p_{cv}$. The first measured characteristic pressure $p_{cm1}$ is below the lower threshold $S_3$ at the anticipated characteristic pressure $p_{cv}$ and therefore outside the tolerance range 320, with the result that the error 211 is output and the pressure sensor 140 is categorized as defective. The second measured characteristic pressure $p_{cm2}$ lies directly on the angle bisector 310 for the anticipated characteristic pressure $p_{cv}$ and therefore represents an optimum pressure sensor 140, for which reason an error 212 is not output.

The invention claimed is:

1. A SCR system comprising a feed module with a feed pump, a metering valve connected to the feed module by a pressure line, a pressure sensor, at least one return line, an expansion body having an equalization chamber separated by an elastic diaphragm from a fluid which flows through part of the expansion body, a mechanical spring configured to apply an additional spring force to the diaphragm, the spring having a mechanical prestress, and an electronic controller configured to:
define an anticipated characteristic pressure at which the spring force of the spring of the expansion body is overcome, by setting the prestress of the spring in the expansion body;
set an initial pressure in the SCR system above the anticipated characteristic pressure;
stop the feed pump with the metering valve closed, when the initial pressure is reached;
determine a pressure rate in the pressure line over time by means of the pressure sensor;
determine a significant change in the pressure rate at which the change in the pressure rate is above a first threshold;
determine a measured characteristic pressure at which the significant change in the pressure rate has been determined; and
output a fault for the pressure sensor if the measured characteristic pressure is not between thresholds which are dependent on the anticipated characteristic pressure.

2. The SCR system according to claim 1, wherein the mechanical prestress of the spring is applied by means of a mechanical stop.

3. The SCR system according to claim 1, wherein the equalization chamber has a pressure-equalization opening.

4. The SCR system according to claim 1, wherein an orifice is arranged in the return line.

5. The SCR system according to claim 1, wherein a restrictor is arranged in the return line.

6. A method for monitoring a pressure sensor in an SCR system, the system including an expansion body arranged in a pressure line, at least one return line, the expansion body having an equalization chamber separated by an elastic diaphragm from a fluid which flows through a part of the expansion body, a mechanical spring configured to apply an additional spring force to the diaphragm, the spring having a mechanical prestress, the method comprising:
defining an anticipated characteristic pressure at which a spring force of the spring of the expansion body is overcome, by setting the prestress of the spring in the expansion body;
setting an initial pressure in the SCR system above the anticipated characteristic pressure;
stopping a feed pump coupled with a metering valve connected to the feed pump closed, when the initial pressure is reached;
determining a pressure rate in the pressure line over time by means of the pressure sensor;
determining a significant change in the pressure rate at which the change in the pressure rate is above a first threshold;
determining a measured characteristic at which the significant change in the pressure rate has been determined; and
outputting a fault for the pressure sensor if the measured characteristic pressure is not between thresholds which are dependent on the anticipated characteristic pressure.

7. The method according to claim 6, wherein the pressure rate is a relative pressure rate.

8. The method according to claim 6, wherein the prestress of the spring is set in such a way that the anticipated characteristic pressure is outside a use range of the SCR system.

9. The method according to claim 8, wherein the prestress of the spring is set in such a way that the anticipated characteristic pressure is above a use range of the SCR system.

10. A non-transitory computer-readable medium storing instructions that, when executed by a processor of a computer, cause the computer to perform operations to control a system that includes an expansion body arranged in a pressure line, the expansion body having an equalization chamber separated by an elastic diaphragm from a fluid which flows through a part of the expansion body, at least one return line, a mechanical spring configured to apply an additional spring force to the diaphragm, the spring having a mechanical prestress, the operations comprising:
defining an anticipated characteristic pressure at which a spring force of the spring of the expansion body is overcome, by setting the prestress of the spring in the expansion body;
setting an initial pressure in the SCR system above the anticipated characteristic pressure;
stopping a feed pump coupled, with a metering valve connected to the feed pump closed, when the initial pressure is reached;
determining a pressure rate in the pressure line over time by means of the pressure sensor;
determining a significant change in the pressure rate at which the change in the pressure rate is above a first threshold;

determining a measured characteristic pressure at which the significant change in the pressure rate has been determined; and outputting a fault for the pressure sensor if the measured characteristic pressure is not between thresholds which are dependent on the anticipated characteristic pressure.

* * * * *